(12) United States Patent
Nesgaard (10) Patent No.: US 11,414,935 B2
(45) Date of Patent: Aug. 16, 2022

(54) INTERVENTION SYSTEM AND METHOD FOR OPERATING AN INTERVENTION SYSTEM

(71) Applicant: WELLTEC A/S, Allerød (DK)

(72) Inventor: Carsten Nesgaard, Allerød (DK)

(73) Assignee: Welltec A/S, Allerød (DK)

( * ) Notice: Subject to any disclaimer, the term of this patent is extended or adjusted under 35 U.S.C. 154(b) by 424 days.

(21) Appl. No.: 16/599,348

(22) Filed: Oct. 11, 2019

(65) Prior Publication Data

US 2020/0115964 A1 Apr. 16, 2020

(30) Foreign Application Priority Data

Oct. 12, 2018 (EP) .................................. 18200224

(51) Int. Cl.
| | |
|---|---|
| *E21B 17/20* | (2006.01) |
| *E21B 17/00* | (2006.01) |
| *H02G 11/02* | (2006.01) |
| *E21B 47/13* | (2012.01) |
| *E21B 23/00* | (2006.01) |
| *E21B 23/14* | (2006.01) |
| *E21B 47/12* | (2012.01) |
| *H02G 9/06* | (2006.01) |

(52) U.S. Cl.
CPC .......... *E21B 17/206* (2013.01); *E21B 17/003* (2013.01); *E21B 23/001* (2020.05); *E21B 23/14* (2013.01); *E21B 47/12* (2013.01); *E21B 47/13* (2020.05); *H02G 11/02* (2013.01); *H02G 9/06* (2013.01)

(58) Field of Classification Search
CPC ...... E21B 17/003; E21B 17/206; E21B 47/13; E21B 23/001; E21B 23/14; E21B 47/113; E21B 47/12; E21B 47/01; H02G 9/06; H02G 11/02
See application file for complete search history.

(56) References Cited

U.S. PATENT DOCUMENTS

| | | | |
|---|---|---|---|
| 7,496,258 B1 | 2/2009 | Varkey | |
| 8,807,225 B2 | 8/2014 | Varkey et al. | |
| 9,027,657 B2 * | 5/2015 | Varkey | ................... D07B 1/147 166/380 |
| 9,784,049 B2 * | 10/2017 | Sherman | .................. H01B 7/14 |

(Continued)

FOREIGN PATENT DOCUMENTS

| | | |
|---|---|---|
| EP | 3 057 106 | 1/2018 |
| WO | 2011/037974 | 3/2011 |

(Continued)

OTHER PUBLICATIONS

International Search Report dated Dec. 10, 2019 in International Application No. PCT/EP2019/077556, 11 pages.

(Continued)

*Primary Examiner* — Nicole Coy (74) *Attorney, Agent, or Firm* — Nixon & Vanderhye P.C.

(57) ABSTRACT

An intervention system is provided. The intervention system comprises a cable being configured to be lowered into a wellbore, said cable having an inner tube enclosing one or more electrical conductors, and an outer tube surrounding the inner tube. The intervention system further comprises a downhole tool being connected to a distal end of the cable and being configured to pull the cable into the wellbore.

20 Claims, 6 Drawing Sheets

(56) References Cited

U.S. PATENT DOCUMENTS

| | | | |
|---|---|---|---|
| 11,127,512 B2* | 9/2021 | Sangar | E21B 17/003 |
| 2004/0244982 A1 | 12/2004 | Chitwood et al. | |
| 2009/0211768 A1* | 8/2009 | Cherbettchian | G02B 6/4463 |
| | | | 254/134.3 R |
| 2015/0226021 A1 | 8/2015 | Zhang et al. | |
| 2016/0222736 A1* | 8/2016 | Varkey | E21B 17/206 |
| 2017/0186512 A1* | 6/2017 | McFarland | H01B 7/18 |
| 2018/0023352 A1 | 1/2018 | Sherman et al. | |

FOREIGN PATENT DOCUMENTS

| | | |
|---|---|---|
| WO | 2015/038150 | 3/2015 |
| WO | 2015/095954 | 7/2015 |

OTHER PUBLICATIONS

Extended European Search Report for EP18200224.6 filed Mar. 27, 2019, 6 pages.

* cited by examiner

INTERVENTION SYSTEM AND METHOD FOR OPERATING AN INTERVENTION SYSTEM

This application claims priority to EP Patent Application No. 18200224.6 filed Oct. 12, 2018, the entire contents of which are hereby incorporated by reference.

DESCRIPTION

The present invention relates to downhole operations, and to an intervention system for use downhole. The present invention also relates to a method for operating an intervention system downhole.

BACKGROUND

A wireline is a cable used to lower equipment and/or tools downhole. The wireline is provided with one or more electrical conductors in order to transmit data to and from the lowered tool, which typically is attached to the distal end of the wireline. Examples of downhole tools that can be operated by means of a wireline include resistivity tools, acoustic tools, and seismic tools.

In order to improve downhole operations, it has been suggested to provide the wireline in the form of a cable instead of a coiled tubing. Such cable has a rigid exterior layer, which ensures that the cable returns to a straight shape when unwound from a spool. The cable is also provided with a central cavity, being formed by a hollow tube; the hollow tube is fixated inside the exterior layer by means of a filler material, and is used to protect e.g. electrical cables from axial and radial stresses in the exterior layer.

Compared to coiled tubing the cable can be made much smaller, which is advantageous as it causes reduced changes to the fluid flow downhole. However, it is well known that available cables will break if pushed too hard or too far downhole. This problem typically occurs when the frictional force between the cable and the wellbore exceeds the pushing force acting on the cable.

From the above it is understood that there is room for improvements, and especially for an intervention system which allows for a further lowering of the wireline tool as compared to prior art solutions.

The above-mentioned problem is at least to some extend solved by an intervention system according to claim 1.

The intervention system comprises a cable being configured to be lowered into a wellbore, said cable having an inner tube enclosing one or more electrical conductors, and an outer tube surrounding the inner tube. The intervention system further comprises a downhole tool being connected to a distal end of the cable and being configured to pull the cable into the wellbore, wherein the tool is connected to at least one of the electrical conductors of the cable, and wherein the tool is configured to receive and/or transmit data signals and/or power via at least one of the electrical conductors of the cable, and wherein the outer tube is made of a composite material being electrically conducting.

In an embodiment, the tool is electrically connected to the composite material for providing current return via the composite material for transmitting and/or receiving data signals and/or power.

By current return is meant a return path for electric current in order to provide an electric circuit.

By using the composite material for current return or return path, a separate return conductor is no longer needed and thereby a lot of different cables can be used which is normally designed for other use where no return path in the form of a separate return conductor is present. A lot of cables are used for sensor measurements e.g. by using optical fibers and only designed for such use. But by being able to provide current return via the composite material, these simple cables can be used.

Furthermore, when electrically connecting the tool to the composite material as current return, the downhole tool can always be operated even when using more advanced cables having a normal return path which for some reasons is destroyed, and then the downhole tool can still be operated and thus does not get stuck in the hole. This is especially important when having a tool which in operation project an arm, an anchor, or a bit, and which projecting element if not retracted can result in the tool getting stuck downhole.

Thus, the well tubular metal structure or casing is not used as current return.

The composite material may comprise carbon. In some embodiments, the composite material comprises more than 40 volume-% carbon, preferably more than 50 volume-% carbon, more preferably more than 60 volume-% carbon.

Each one of the electrical conductors may be galvanically insulated from the outer tube.

The composite material may comprise carbon fiber arranged in a polymer matrix.

In an embodiment, the cable comprises one or more optical fibers. The optical fibers may be used as sensors, e.g. configured to provide temperature and/or pressure measurements.

The cable may further comprise a filler material fixating the inner tube inside the outer tube.

The optical fibers may be arranged in the outer tube, the filler material, or inside the inner tube.

The outer tube may form the exterior surface of the cable.

In other embodiments, the cable may further comprise an insulating cover arranged on the external side of the outer tube.

The thickness of said insulating cover may be below 5 mm, preferably below 2 mm, even more preferably below 1 mm, such as below 0.5 mm.

In an embodiment, the downhole tool comprises at least one of: a downhole driving unit, such as a downhole tractor, a well cleaning device, an anchoring tool, a key tool, a punching tool, and a milling tool.

According to a second aspect, a method for operating an intervention system downhole is provided. The intervention system comprises a cable having an inner tube enclosing one or more electrical conductors as well an outer tube surrounding the inner tube, and a downhole tool. The method comprises electrically connecting the downhole tool to at least one of the electrical conductors of the cable at a distal end of the cable, operating the downhole tool so that the downhole tool is pulling the cable into a wellbore, and receiving and/or transmitting data signals and/or power via at least one of the electrical conductors of the cable.

The method may further comprise electrically connecting the downhole tool to the composite material for providing current return via the composite material when transmitting and/or receiving data signals and/or power.

Embodiments of the invention will be described in the following; references being made to the appended diagrammatical drawings which illustrate non-limiting examples of how the inventive concept can be reduced into practice.

Hereinafter, certain embodiments will be described more fully with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

Figure 1:
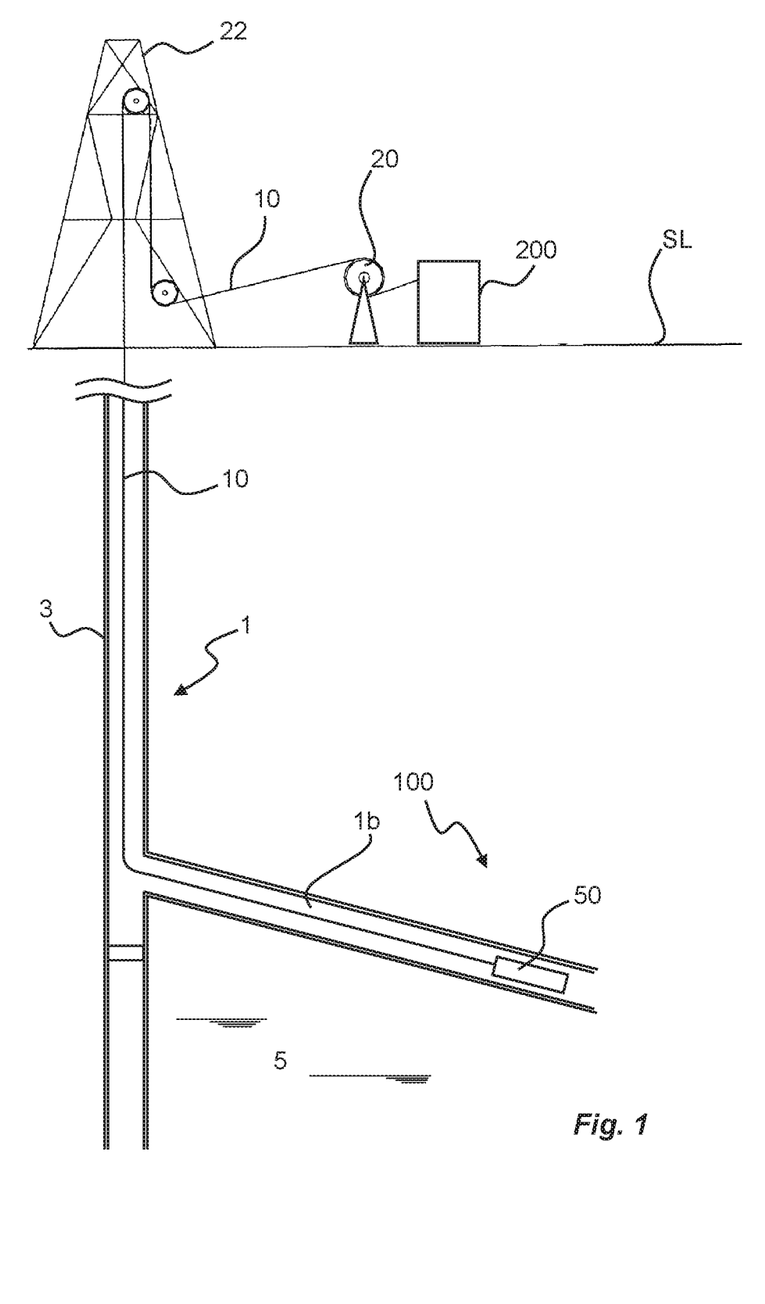
FIG. 1 is a schematic view of an intervention system during downhole operation.

FIG. 1 shows a wellbore 1, and equipment for performing a downhole operation in the wellbore 1. The wellbore 1 is provided with a well tubular structure 3 being arranged for producing hydrocarbon-containing fluid from a reservoir 5. A wireline, in the form of a cable 10, is spooled on a reel 20 at the surface level SL. The cable 10 is guided by a tower 22 before entering the wellbore 1, which is illustrated as initially vertically extending. At some depth, a lateral wellbore 1b is formed into which the cable 10 is guided. At its distal end, the cable 10 connected to a downhole tool 50. The opposite end of the cable 10, i.e. the end at the surface level SL, is connected to control equipment 200. The control equipment 200 may e.g. comprise a power supply for powering the downhole tool 50 via the cable 10, one or more control units for processing, transmitting, and/or receiving data signals via the cable 10, as well as other devices known in the art and used to ensure proper operation of the intervention system 100.

It should be noted that the shown setup is only representing one example; other configurations and equipment are equally possible as long as they include an intervention system 100, i.e. a wireline 10 and a downhole tool 50 connected thereto.

As will be further understood by the following paragraphs, the downhole tool 50 is connected to the end of the cable 10 in order to pull the cable 10 into the wellbore 1. Typically, the cable 10 will have a tensile strength being far greater than its compressive strength. As the downhole tool 50 will pull the cable 10 downwards, the cable 10 can be lowered far more than if pushed downwards.

Figure 2:
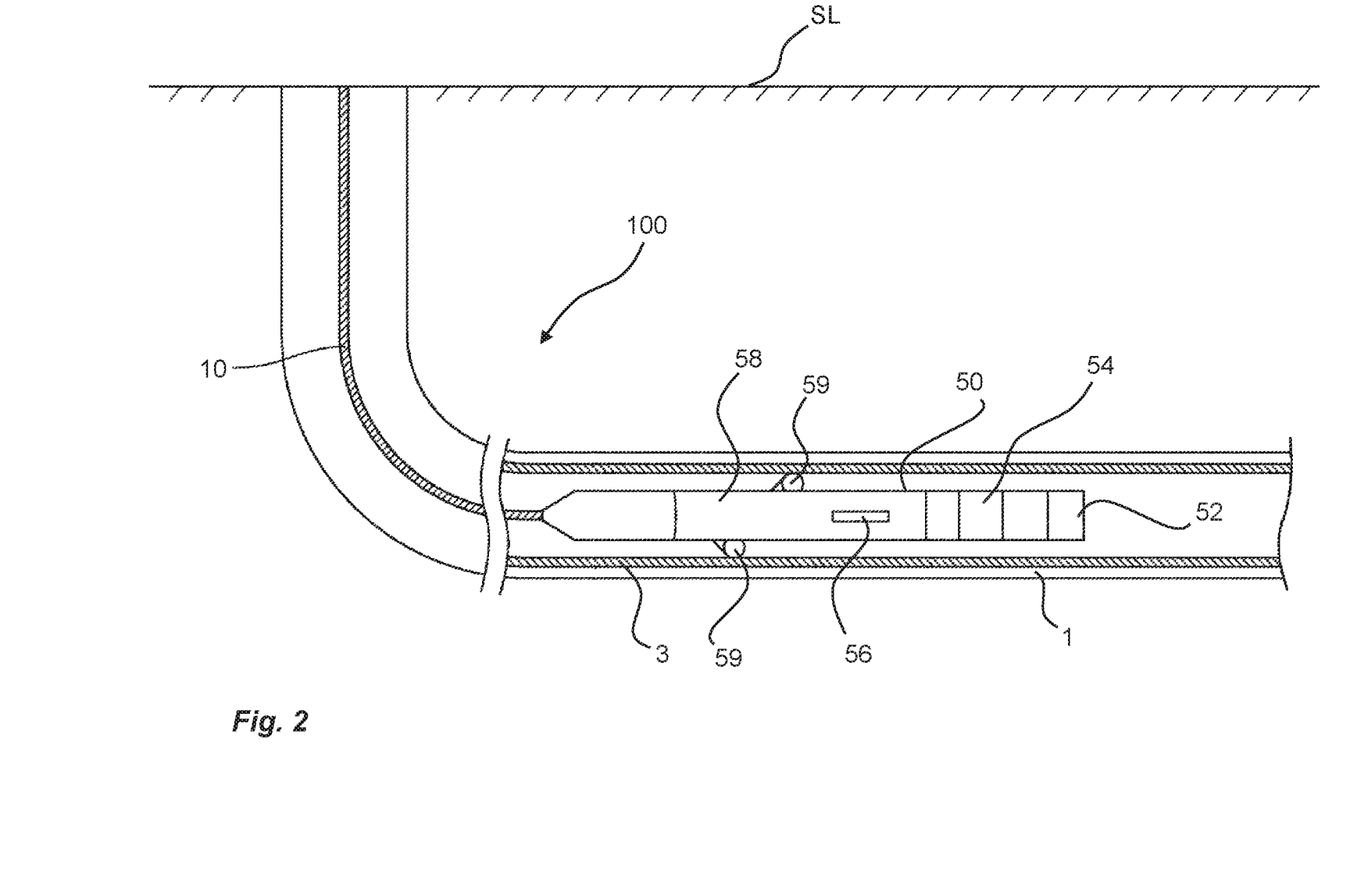
FIG. 2 is a schematic view of an intervention system according to an embodiment.

In FIG. 2 a more detail view of an intervention system 100 is presented, i.e. the cable 10 and the connected downhole tool 50. As can be seen in FIG. 2, the downhole tool 50 is suspended inside a casing 3, which forms the tubular structure for supporting the wellbore 1.

The shown tool 50 has an active part 52, means 54 for controlling the active part 52, one or more sensors 56, and means 58 for advancing the entire tool 50. The active part 52 may e.g. be a cutter, a drill bit, a power suction tool, or other active parts being suitable to perform an operation downhole. Means 54 for controlling the active part 52 may consequently comprise rotation means for rotating the drill bit or a cutting head, or a pump for circulation fluid in the power suction tool.

The one or more sensors 56 are configured to sense and to transmit detected physical properties like vibrations, temperature, etc. during operation of the wireline tool 50. Preferably, the sensors 56 are arranged inside the wireline tool 50.

In the wireline tool 50 shown in FIG. 2, the means 58 for advancing the active part 52 is a downhole tractor providing a forward motion by means of multiple driving wheels 59 extending towards the side of the casing 3. The downhole tractor 58 also functions as a centralizer. The wheels 59 may be driven by a hydraulic system and provide the necessary traction to move the active part 52 downhole. The means 58 for advancing the active part 52 may in other embodiments be a piston arrangement, such as a hydraulic piston.

Figure 3A:
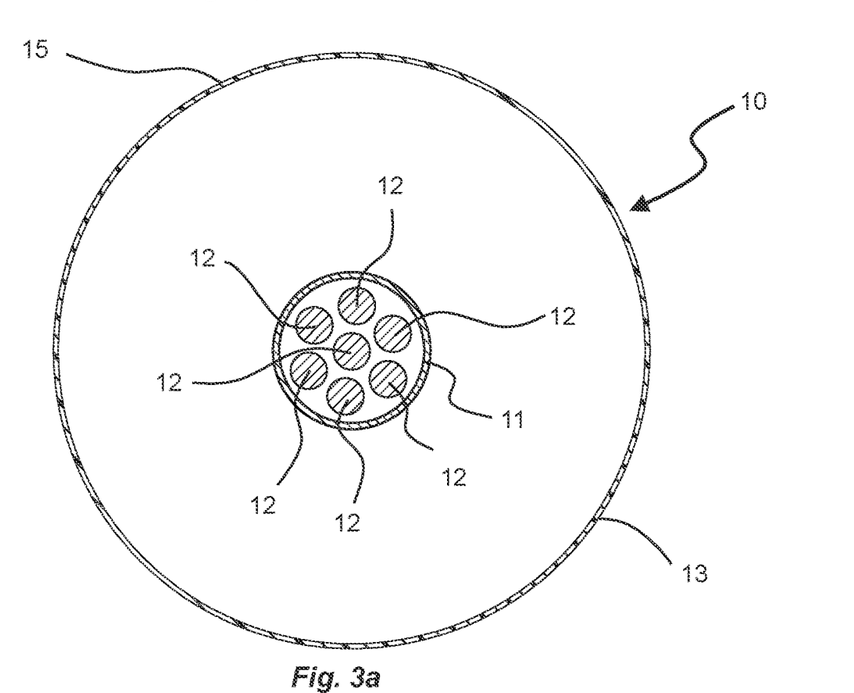
FIG. 3a is a cross-sectional view of a cable according to an embodiment, forming part of an intervention system.

In FIG. 3a an embodiment of a cable 10, for use with an intervention system 100, is shown in the cross-section. The cable 10 has an inner tube 11, which forms a hollow cavity. The inner tube 11 is preferably cylindrical, i.e. the cross-section is circular. The inner tube 11 is made of a robust material, such as stainless steel or similar and dimensioned to enclose, and guide, a plurality of wires or cables 12. In the shown example, the wires are represented as seven electrical conductors 12; however, in some embodiments one or more of the electrical conductors 12 may be omitted, or replaced by other wire-like components such as optic fibers, etc.

The inner tube 11 is surrounded by an outer tube 13. In the embodiment of FIG. 3a, the outer tube 13 is arranged coaxially immediately outside the inner tube 11. The outer tube 13 is made of a composite material, e.g. a material comprising carbon fiber arranged in a polymer matrix. The amount of carbon in said material may preferably exceed 50%, such that the outer tube 13 will be electrically conducting, for reasons explained below.

The cable 10 may further have an insulating cover 15 arranged on the external side of the outer tube 13. The insulating cover 15 may be a resin cover or similar, being capable of withstanding the harsh conditions downhole.

Figure 3B:
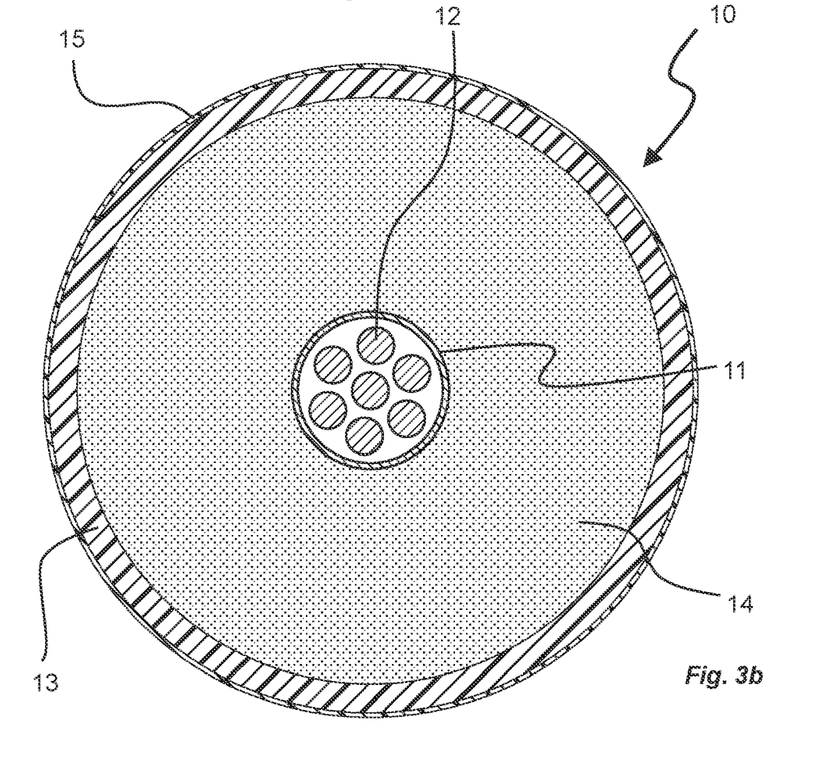
FIG. 3b is a cross-sectional view of a cable according to another embodiment, forming part of an intervention system.

In FIG. 3b another embodiment of a cable 10 is shown. Similar to the embodiment of FIG. 3a, the cable 10 has the inner tube 11 housing the wires 12. The cable 10 also comprises the outer tube 13, which in this embodiment is made much thinner. Instead, a filler material 14 is arranged radially outwards of the inner tube 11, and radially inwards of the outer tube 13, for fixating the inner tube 11 inside the outer tube 13. The filler material may be any suitable material, having the purpose of affecting the density of the cable 10 and for supporting the inner tube 11 inside the outer tube 13. As for the embodiment of FIG. 3a, the cable may also be provided with an external insulating layer 15.

Figure 3C:
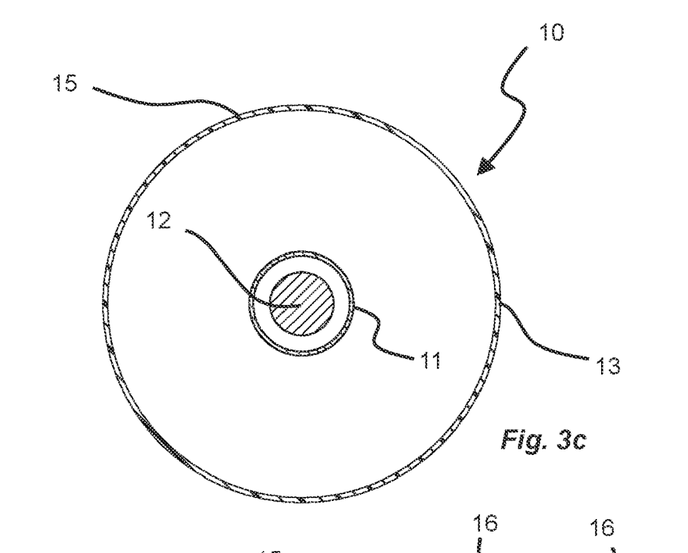
FIG. 3c is a cross-sectional view of a cable according to another embodiment, forming part of an intervention system.

In FIG. 3c another embodiment of a cable 10 is shown. The cable 10 is similar to the cable shown in FIG. 3a, but in this embodiment there is only one electrical conductor 12 arranged within the inner tube 11.

Figure 3D:
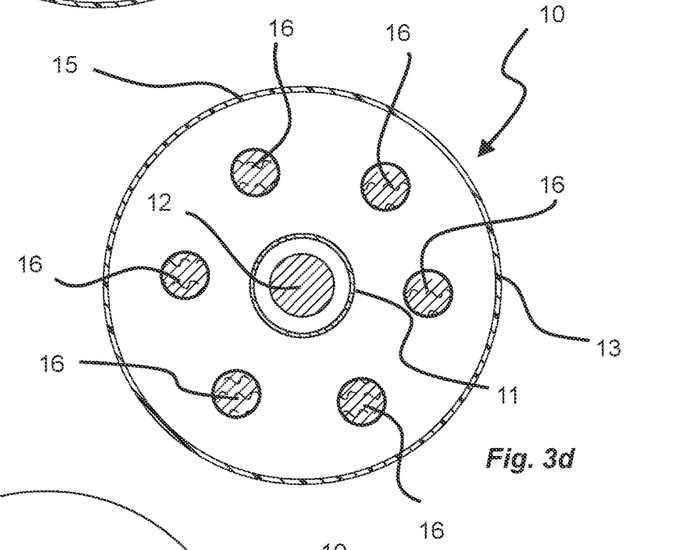
FIG. 3d is a cross-sectional view of a cable according to another embodiment, forming part of an intervention system.

FIG. 3d is showing another example of a cable 10. In this embodiment, which is based on the embodiment of FIG. 3c, one or more optical fibers 16 are provided. In the shown example a plurality of optical fibers 16 are distributed in a spaced-apart manner within the outer tube 13, but it would also be possible to arrange the one or more optical fibers 16 in a filler material 14 (see FIG. 3b) or within the inner tube 11. The one or more optical fibers 16 may preferably be used to provide measurements, such as temperature and/or pressure measurements.

Figure 3E:
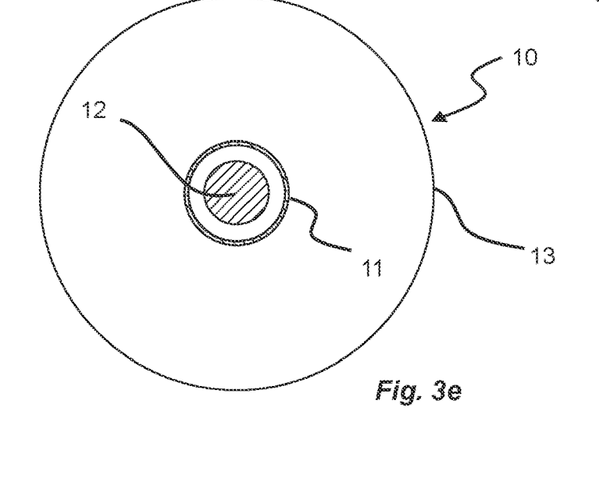
FIG. 3e is a cross-sectional view of a cable according to another embodiment, forming part of an intervention system.

In FIG. 3e, a further embodiment of a cable 10 is shown. The cable 10 is identical to the cable of FIG. 3c, except that the outer insulating layer 15 has been removed.

From the above examples, it is clear that the composite material forming the outer tube 13 can sometimes be provided with an insulating layer 15, and in some embodiments, there is no insulating layer thereby leaving the outer composite tube 13 to form the exterior surface of the cable 10. No insulating layer provides for a very fast and easy connection to the tool 50, especially in the radial direction. However, by providing the insulating layer 15 as a very thin layer, almost the same advantage is obtained even if there is an insulating layer 15 radially outside the outer tube 13. Especially, the insulating cover/layer 15 has a thickness well below 10 mm, such as below 5 mm, even more preferably below 1 mm such as below 0.5 mm. Having such thin insulating layer 15, it is possible to remove parts of it in order to allow for a connection to the composite material of the outer tube 13.

Feeding power to and communicating with down-hole equipment is extremely important. Reliable connections that can withstand the harsh environmental conditions downhole are necessary. An electrical interface to be used downhole should consequently provide at least these features. Further to this, the electrical interface should be as efficient as possible in that it should not be too heavy, too expensive, or too thick.

A typical solution for solving downhole communication is by using shielded conduits or conductors where one conductor may be used for data communication and one for power transfer. Individual or common conductors may be used for return signals. The common conductor is beneficial since it reduces the number of conductors needed but there are drawbacks.

One problem with such solution is that they typically require individually shielded conductors for the communication interface in order to maximize the bandwidth of the signals. The same may be true for the power interface where a shared return path for the current may introduce unwanted inductance and capacitance on the power lines causing the supply voltage to drop when the current consumption of the load increases. The individual shield forms a path for the return current that is as physically close to the conductor as possible, and minimizes the parasitic effects compared to using separate conductors for the return current. The parasitic inductance and capacitance introduced will limit the bandwidth of a signal and may also cause resonances virtually blocking certain frequencies and/or cause unwanted ripple on signal and power lines. This can be compared to a coaxial cable where a shield is arranged around a center conductor such that it provides shielding and a return path for the current. The impedance of a coaxial cable is controlled by an insulating material arranged between the shield and the center conductor together with the dimensions of the center conductor and shield. A coaxial cable typically offers more than fifty times the bandwidth available in e.g. a twisted pair cable used for domestic internet access. The coaxial cable, although bandwidth wise superior to pairwise communication, is a more complex cable and consequently adds cost and weight to a system. The shield used in coaxial cables is typically thin and not suitable to transfer high currents.

With reference to the cable 10 presented in FIGS. 3a-b, the outer tube 13 comprising a composite material will allow it to act as a return path for a signal provided through one or more of the electrical conduits 12. Especially when using a carbon fiber material, the conductivity and current handling of carbon fibers is comparable to that of copper which means that the outer tube 13 will provide a suitable return path for signals and current. This means that the cable 10 may be used to supply power and/or a communication interface to a downhole tool 50 without substantially increasing the number of conductors 12 of the cable.

Figure 4A:
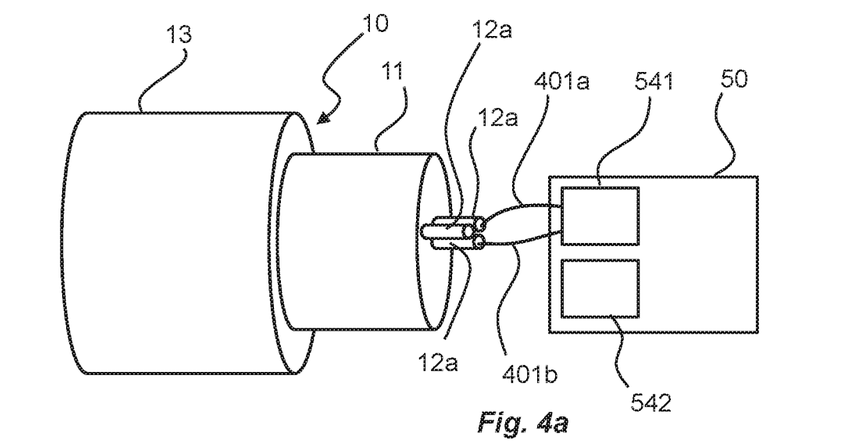
FIGS. 4a-c are schematic views of how a downhole tool is electrically connected to a cable of an intervention system according to various embodiments.

FIG. 4a shows a schematic connection of one embodiment of an intervention system 100 wherein one conduit 12a is used to supply power to a power unit 541 of the downhole tool 50. The downhole tool 50 further comprises a signaling unit 542 but both the power unit 541 and signaling unit 542 are merely illustrating examples and the skilled person will, after reading this disclosure, understand that these units may or may not exist and may be distributed inside the downhole tool 50 or in separate independent or dependent units. A connection 401a-b between the cable 10 and the downhole tool 50 may be realized in numerous ways and in no way limiting examples may be e.g. mechanical connectors, soldering, welding, or crimping. In order to provide a return path for supply current, a second conduit 12a may be used or the downhole tool 50 may use its exterior to contact a casing.

Figure 4B:
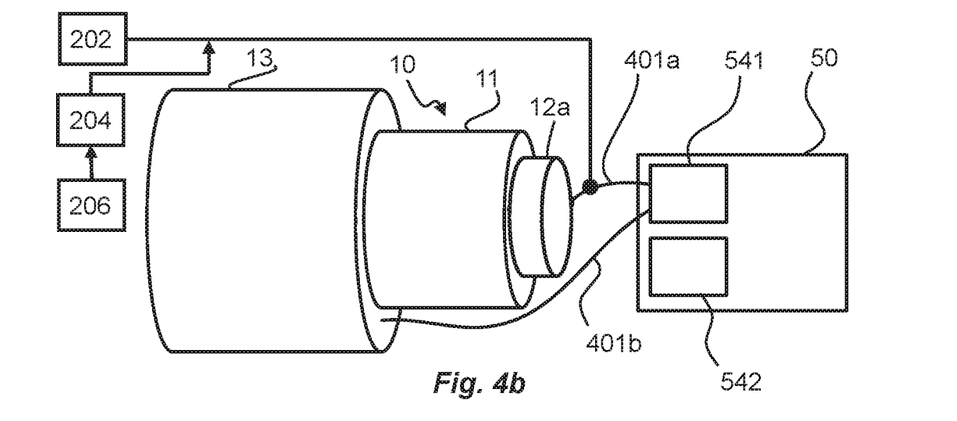

In order to reduce the number of conductors needed in the cable 10 and to ensure a reliable return path for the supply current, the connection between the casing and the downhole tool 50 may not be sufficiently reliable. FIG. 4b shows one embodiment of the intervention system 100 wherein a single electric conductor 12a is connected to the downhole tool 50 via a connection 401a, and the outer tube 13 is connected to the downhole tool 50 via a connection 401b. If the outer tube 13 is made of a conductive material e.g. a composite material or even a composite material comprising carbon fiber arranged in a polymer matrix, the outer tube 13 may provide a return path for the current. In this embodiment, a reliable return path for the supply current is provided and the arrangement of the conductor 12a in relation to the outer tube 13 will have properties similar to those of a coaxial cable offering higher bandwidths compared to embodiments where the conductors are used for the return current. Further to this, one conductor 12a is made available for other uses or it is even made possible to remove. Either way, a more cost efficient, weight efficient, and material efficient cable 10 is achieved since the number of conductors needed is reduced.

The example of the intervention system shown in FIG. 4b may further be provided with a power source 202, such as a direct current source for providing electrical power to the downhole tool 50 via the one conductor 12a and the connection 401a. In addition, a data signal generator 206 is provided and configured to transmit a data signal, via a modulator 204, to the downhole tool 50 also via the single conductor 12a and the connection 401a.

The shown example thereby describes an embodiment using only one conductor 12a and one return path 401b, 13. The conductor 12a will transfer DC power to the downhole tool 50, as well as data being AC coupled (or modulated) onto the DC voltage on the conductor 12a. It is possible to establish the communication in one-way or in two-way, half-duplex. Both techniques can be designed for the least number of conductors possible (only one conductor 12a for power/data to the downhole tool and one return conductor). The return current can be coupled to the cable armor, i.e. the outer tube 13, thus forming the return conductor. The return conductor can not only be the composite material of the outer tube 13; it is also possible to allow the return current to be coupled to steel, wellbore casing, wellbore fluids, etc., or a combination of them all.

FIG. 4*b* is thereby showing an embodiment where a single center conductor 12*a* is used for both power/data and where the outer tube 13 is the return for both as well.

Figure 4C:
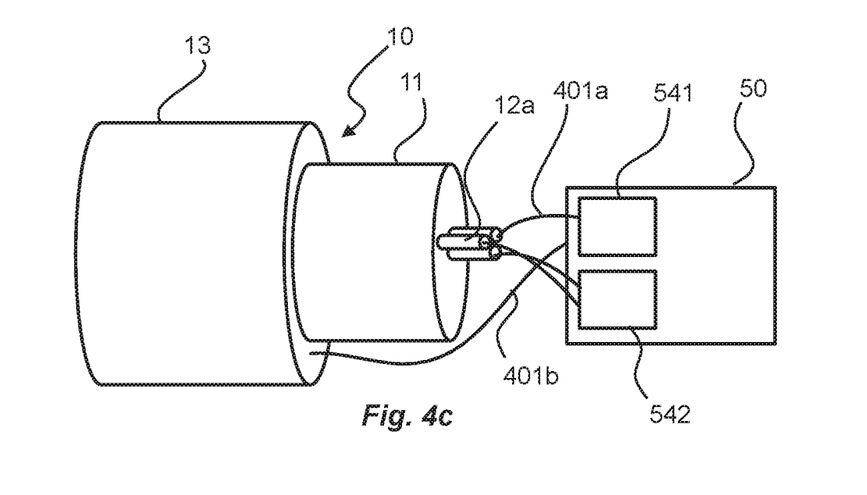

Now turning to FIG. 4*c*, another embodiment is presented wherein one of the conductors 12*a* is used to provide power to the power unit 541 of the downhole tool 50 and other conductors 12*a* are connected to the signaling unit 542; these may be used as a signaling interface suitable for e.g. communicating and controlling the downhole tool 50 and any sensors 56 or other equipment comprised in the downhole tool 50.

The embodiment presented above with reference to FIGS. 4*a-c* should be considered as non-limiting examples of embodiments. From these examples, it can be devised that other combinations wherein e.g. more than one power conductor or more than one signaling conductor are provided. Further to this, any combination of power conductors and signaling conductors are possible and are well within the scope of this description.

The discussions above have been referring to the outer tube 13 as providing a return current, this is merely one way of expressing the relation and direction of the current and it should be understood that the outer tube 13 may very well be used for supplying current to the downhole tool 50 and one of the conductors may provide the path for the return current. The same reasoning applies for signaling conductors.

Preferably, the outer tube 13 is used as a common reference when interfacing the downhole tool 50. Typically, this would imply a ground potential.

Figure 5:
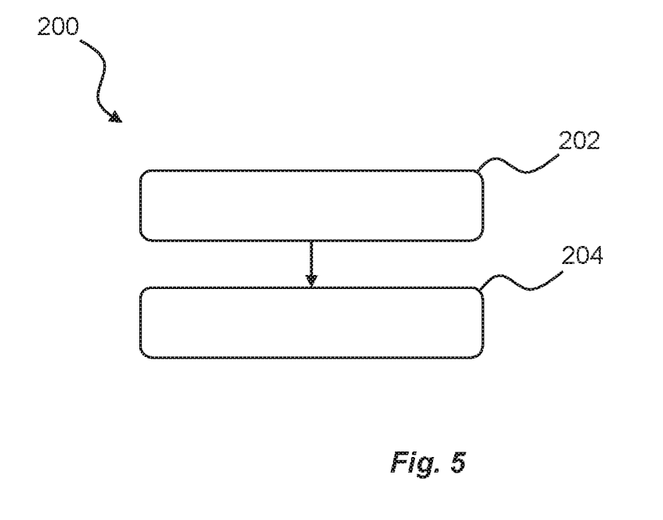
FIG. 5 is a schematic view of a method for operating an intervention system downhole.

Now turning to FIG. 5, a method 200 for operating an intervention system 100 is schematically shown. As explained earlier, the intervention system 100 comprises a cable 10 and a downhole tool 50. The method 200 comprises a first step 202 of connecting the downhole tool 50 to one end of the cable 10, and a further step 204 of operating the downhole tool 50 such that it pulls the cable 10 further down the wellbore.

The step 202 of connecting the downhole tool 50 to the cable 10 does not only include establishing a mechanical connection, but also connecting the downhole tool 50 electrically to the cable 10. Preferably, this is done in accordance with the description relating to FIGS. 4*a-c* above.

A stroking tool is a tool providing an axial force. The stroking tool comprises an electrical motor for driving a pump. The pump pumps fluid into a piston housing to move a piston acting therein. The piston is arranged on the stroker shaft. The pump may pump fluid into the piston housing on one side and simultaneously suck fluid out on the other side of the piston.

By a casing or well tubular metal structure is meant any kind of pipe, tubing, tubular, liner, string etc. used downhole in relation to oil or natural gas production.

By fluid or well fluid is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

In the event that the tool is not submergible all the way into the casing, a downhole driving unit such as a downhole tractor can be used to push the tool all the way into position in the well. The downhole tractor may have projectable arms having wheels, wherein the wheels contact the inner surface of the casing for propelling the tractor and the tool forward in the casing. A downhole tractor is any kind of driving tool capable of pushing or pulling tools in a well downhole, such as a Well Tractor®.

The invention claimed is:

1. An intervention system, comprising a cable being configured to be lowered into a wellbore, said cable having an inner tube enclosing one or more electrical conductors, an outer tube surrounding the inner tube, wherein the intervention system further comprises a downhole tool being connected to a distal end of the cable and being configured to pull the cable into the wellbore, wherein the tool is electrically connected to at least one of the electrical conductors of the cable, the tool is configured to receive and/or transmit data signals and/or power via at least one of the electrical conductors of the cable and wherein the outer tube is made of a composite material being electrically conducting, and wherein the tool is electrically connected to the composite material for providing current return via the composite material for transmitting and/or receiving data signals and/or power.

2. An intervention system according claim 1, wherein the composite material comprises carbon.

3. An intervention system according to claim 2, wherein the composite material comprises more than 40 volume-% carbon.

4. An intervention system according to claim 2, wherein the composite material comprises more than more than 50 volume-% carbon.

5. An intervention system according to claim 2, wherein the composite material comprises more than 60 volume-% carbon.

6. An intervention system according to claim 1, wherein each one of the electrical conductors is galvanically insulated from the outer tube.

7. An intervention system according to claim 1, wherein the composite material comprises carbon fiber arranged in a polymer matrix.

8. An intervention system according to claim 1, wherein the cable comprises one or more optical fibers.

9. An intervention system according to claim 8, wherein the one or more optical fibers are used as sensors configured to provide temperature and/or pressure measurements.

10. An intervention system according to claim 8, wherein the one or more optical fibers are arranged in the outer tube, the filler material, or inside the inner tube.

11. An intervention system according to claim 1, wherein the cable further comprises a filler material fixating the inner tube inside the outer tube.

12. An intervention system according to claim 1, wherein the outer tube forms the exterior surface of the cable.

13. An intervention system according to claim 1, wherein the cable further comprises an insulating cover arranged on the external side of the outer tube.

14. An intervention system according to claim 13, wherein the thickness of said insulating cover is below 5 mm.

15. An intervention system according to claim 13, wherein the thickness of said insulating cover is below 2 mm.

16. An intervention system according to claim 13, wherein the thickness of said insulating cover is below 1 mm.

17. An intervention system according to claim 13, wherein the thickness of said insulating cover is below 0.5 mm.

18. An intervention system according to claim 1, wherein the downhole tool comprises at least one of: a downhole driving unit, a well cleaning device, an anchoring tool, a key tool, a punching tool, a stroking tool, and a milling tool.

19. An intervention system according to claim 18, wherein the downhole tool comprises the downhole driving unit in the form of a downhole tractor.

20. A method for operating an intervention system according to claim 1 downhole, wherein the method comprises:
- electrically connecting the downhole tool to at least one of the electrical conductors of the cable at a distal end of the cable,
- operating the downhole tool such that the downhole tool is pulling the cable into a wellbore, and
- receiving and/or transmitting data signals and/or power via at least one of the electrical conductors of the cable, wherein the method further comprises
- electrically connecting the downhole tool to the composite material for providing current return via the composite material when transmitting and/or receiving data signals and/or power.

\* \* \* \* \*